(12) United States Patent
Rakei

(10) Patent No.: US 9,566,848 B2
(45) Date of Patent: *Feb. 14, 2017

(54) VEHICLE DOOR REINFORCING BEAM

(71) Applicant: Frank Rakei, Berlin (DE)

(72) Inventor: Frank Rakei, Berlin (DE)

(73) Assignee: MAGNA AUTOMOTIVE SERVICES GMBH, Sailauf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/486,601

(22) Filed: Sep. 15, 2014

(65) Prior Publication Data

US 2015/0001878 A1    Jan. 1, 2015

Related U.S. Application Data

(63) Continuation of application No. 13/510,965, filed as application No. PCT/EP2010/007137 on Nov. 24, 2010, now Pat. No. 8,851,553.

(60) Provisional application No. 61/264,348, filed on Nov. 25, 2009.

(51) Int. Cl.
  *B60J 5/04*     (2006.01)
  *B21D 22/24*    (2006.01)
  *B21D 53/88*    (2006.01)

(52) U.S. Cl.
  CPC .............. *B60J 5/0444* (2013.01); *B21D 22/24* (2013.01); *B21D 53/88* (2013.01)

(58) Field of Classification Search
  CPC ......... B60J 5/0444; B21D 53/88; B61D 22/24
  USPC .................... 296/187.12, 146.6; 293/102
  See application file for complete search history.

(56) References Cited

U.S. PATENT DOCUMENTS

| 5,992,922 A | * | 11/1999 | Harbig et al. ............. 296/146.6 |
| 2004/0150249 A1 | * | 8/2004 | Gehringhoff et al. ..... 296/146.6 |
| 2006/0071485 A1 | * | 4/2006 | Karlander ..................... 293/102 |
| 2009/0322117 A1 | * | 12/2009 | Arvidsson et al. ........ 296/146.6 |
| 2012/0146359 A1 | * | 6/2012 | Wille et al. ................ 296/146.6 |

FOREIGN PATENT DOCUMENTS

| JP | 10166860 A | 6/1998 |
| JP | 2006056387 A | 3/2006 |
| WO | 2009/118609 A1 | 10/2009 |

* cited by examiner

*Primary Examiner* — Jason S Morrow
(74) *Attorney, Agent, or Firm* — Dickinson Wright PLLC

(57) ABSTRACT

A structural door beam for vehicles, and a method for making the same, is provided. The structural door beam has an elongate multiple channel structure defined by a central web of given thickness and known material composition, and includes end mounting-flanges integrally formed therewith. The elongate multiple channel structure comprises two outer channels separated one from the other in a lateral direction, and a third channel disposed between the two outer channels. The third channel defines a trough within the medial region between the two outer channels. A first one of the two outer channels is drawn to a peak of known height and the trough is drawn to a known depth, such that the trough to peak distance exceeds a maximum distance that is achievable in a single cold forming operation for the given thickness and material composition of the web.

9 Claims, 5 Drawing Sheets

VEHICLE DOOR REINFORCING BEAM

CROSS REFERENCE TO RELATED APPLICATIONS

This U.S. Continuation Patent Application claims priority to U.S. Pat. No. 8,851,553 issued on Oct. 7, 2014 entitled "Vehicle Door Reinforcing Beam," which claims priority to International Patent Application Serial No. PCT/EP2010/007137 filed on Nov. 24, 2010, entitled "Vehicle Door Reinforcing Beam" which claims priority to U.S. Provisional Patent Application No. 61/264,348 filed on Nov. 25, 2009, entitled "Vehicle Door Reinforcing Beam," the entire disclosures of all of these applications being considered part of the disclosure of this application and are hereby incorporated by reference.

FIELD OF THE INVENTION

The invention relates generally to a structural door beam, and more particularly to a structural door beam for use in a side door of an automotive vehicle.

BACKGROUND OF THE INVENTION

Structural door beams are designed to protect automobile occupants from injury during a side impact collision. When properly designed, the structural door beam should have high rigidity in a direction transverse to the direction of the force applied during a side impact automobile collision. Commonly, structural door beams are stamped from sheet metal to various cross sectional shapes, including hat-shaped or corrugated configurations. In some cases, reinforcement plates are welded to the beam and/or any voids therein are filled with foam materials, etc. The stiffness of the resulting structural door beam is improved, but this improvement is accompanied by increased weight and/or cost of the vehicle door.

In order to meet minimum fuel efficiency requirements and to reduce the unit cost of new automobiles, without sacrificing passenger safety, there has been an ongoing effort to reduce the mass and/or cost of automobile components. Accordingly, it would be desirable to provide a structural door beam possessing improved stiffness compared to a currently available structural door beam of similar mass and of similar material composition.

SUMMARY OF EMBODIMENTS OF THE INVENTION

In accordance with an aspect of the invention, a structural door beam for vehicles is provided. The structural door beam includes a sheet metal strip with end mounting flanges integrally formed therewith to secure the structural door beam to a vehicle door. The sheet metal strip includes, in cross section, a profile having two peaks and a valley disposed between the two peaks. Each of the two peaks includes a top section and two opposite sidewalls integral with the top section. Each of the two peaks further includes a first sidewall that extends away from the top section of the peak toward an open base section thereof. Each of the first sidewalls is integral with an outer flange defined along an edge of the sheet metal strip adjacent to the open base section of the peak. A second sidewall extends away from the top section of the peak further than the first sidewall to define simultaneously one of two opposite sidewalls of the valley. One of the two peaks includes a height H measured vertically along a first direction from the open base section to the top section of the peak. The valley includes a depth greater than approximately 0.2H measured vertically along a second direction that is opposite the first direction. The depth is measured from the open base section of the one of the two peaks to a bottom section of the valley. The bottom section of the valley is integral with the two opposite sidewalls of the valley.

In accordance with an aspect of the invention, a structural door beam for vehicles is provided. The structural door beam includes a sheet metal strip with end mounting flanges integrally formed therewith to secure the structural door beam to a vehicle door. The sheet metal strip includes, in cross section, a profile having two peaks and a valley disposed between the two peaks. Each of the two peaks includes opposite sidewalls, a top section integral with the opposite sidewalls, and an open base. The valley extends below the outside open base of each of the two peaks by at least approximately 20% of the height of either of the two peaks. The height is measured from the open base to the top section of the either of the two peaks.

In accordance with an aspect of the invention, a structural door beam for vehicles is provided. The structural door beam includes a sheet metal strip with end mounting flanges integrally formed therewith to secure the structural door beam to a vehicle door. The sheet metal strip, of a profiled cross section, includes a bead structure having first, second and third beads that extend in a longitudinal direction along at least a portion of a length of the beam. The first and second beads are separated one from the other in a lateral direction by a medial region. Outer flanges extend outwardly away from the first and second beads in the lateral direction. The first bead extends in a first direction that is normal to both the lateral and longitudinal directions to a maximum height H. The third bead, located within the medial region, extends in a second direction that is opposite the first direction to a maximum height of at least 0.2H.

In accordance with an aspect of the invention, a structural door beam for vehicles is provided. The structural door beam includes an elongate multiple channel structure that is defined by a central web of a given thickness and known material composition. The structural door beam includes end mounting flanges that are integrally formed therewith to secure the structural door beam to a vehicle door. The elongate multiple channel structure includes two outer channels that are separated one from the other in a lateral direction and a third channel that is disposed between the two outer channels. A first one of the two outer channels is drawn to a peak of known height. The third channel defines a trough between the two outer channels. The material quality and trough to peak distance exceeds a maximum quality and distance that is achievable in a single cold forming operation for the given thickness and material composition of the web.

In accordance with an embodiment of the invention there is provided a method for forming a structural door beam. The method begins by placing a metal sheet blank in a first forming station. The metal sheet blank includes first and second opposite sides. In the first forming operation, a central bead is drawn to a predetermined height above the first side of the metal sheet blank. In the first forming operation, portions of the metal sheet blank that are adjacent to the central bead remain substantially unformed. The metal sheet blank is then transferred to a second forming station. In the second forming operation, two beads, within unformed portions of the sheet metal blank including one bead on each side of the central bead, are drawn to a predetermined height above the second side of the metal sheet blank.

BRIEF DESCRIPTION OF THE DRAWINGS

Exemplary embodiments of the invention will now be described in conjunction with the following drawings, in which.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1:
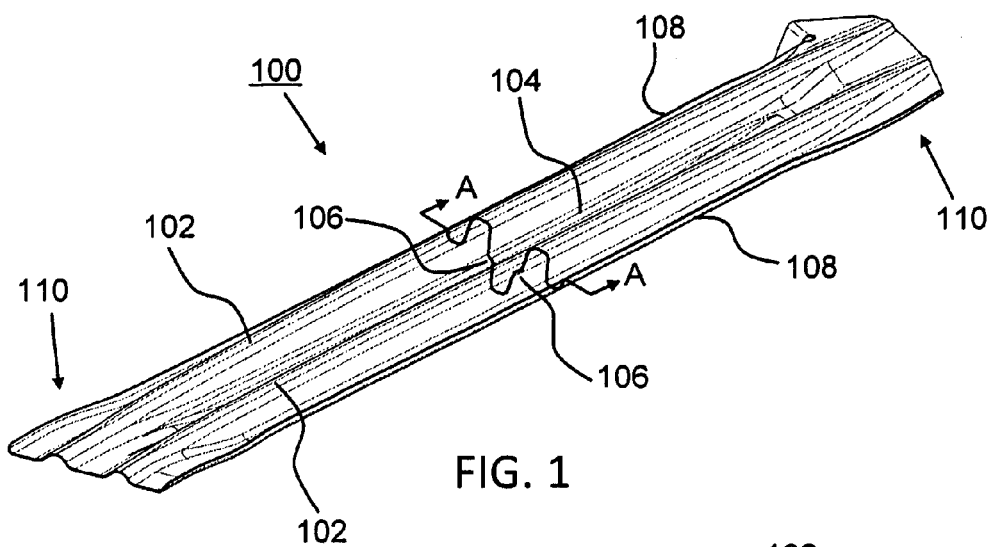
FIG. 1 is a perspective view of a structural door beam for vehicles according to an embodiment of the instant invention.

Referring to FIG. 1, shown is a perspective view of a structural door beam for vehicles according to an embodiment of the instant invention. The structural door beam includes an elongated sheet metal strip 100 of a high-strength steel material. By way of a specific and non-limiting example, the high-strength steel material has a tensile strength of at least 600 MPa. Two beads 102 are impressed in the sheet metal strip 100 by a forming method, such as for instance cold forming. In FIG. 1, the two beads 102 are mutually parallel and protrude from a same first side of the structural door beam. Optionally, the two beads 102 are not mutually parallel along at least a portion of the length of the metal strip 100. Disposed between the two beads 102 is a third bead 104, which is also impressed by a forming method, such as for instance cold forming. The third bead 104 extends parallel to each of the two beads 102, but it protrudes from a second opposite side of the structural door beam. A shoulder feature 106, which is visible along the line A-A in FIG. 1, is formed in a transition region between each of the two beads 102 and the third bead 104. In addition, outer flanges 108 extend longitudinally along the side edges of the sheet metal strip 100 between opposite ends thereof.

The two beads 102 extend over the larger part of the length of sheet metal strip 100, and typically will have a maximum height relative to the first side of the sheet metal strip near the line A-A within a central portion of the structural door beam. The height of the two beads 102 decreases at the opposite ends of the sheet metal strip 100, toward integrally formed mounting flanges 110. The integrally formed mounting flanges 110 are for securing the structural door beam to a vehicle door. Similarly, the third bead 104 extends over the larger part of the length of sheet metal strip 100 and typically has a maximum height relative to the second side of the sheet metal strip near the line A-A within the central portion of the structural door beam. The height of the third bead 104 also decreases at the opposite ends of the sheet metal strip 100, toward the integrally formed mounting flanges 110.

Figure 2:
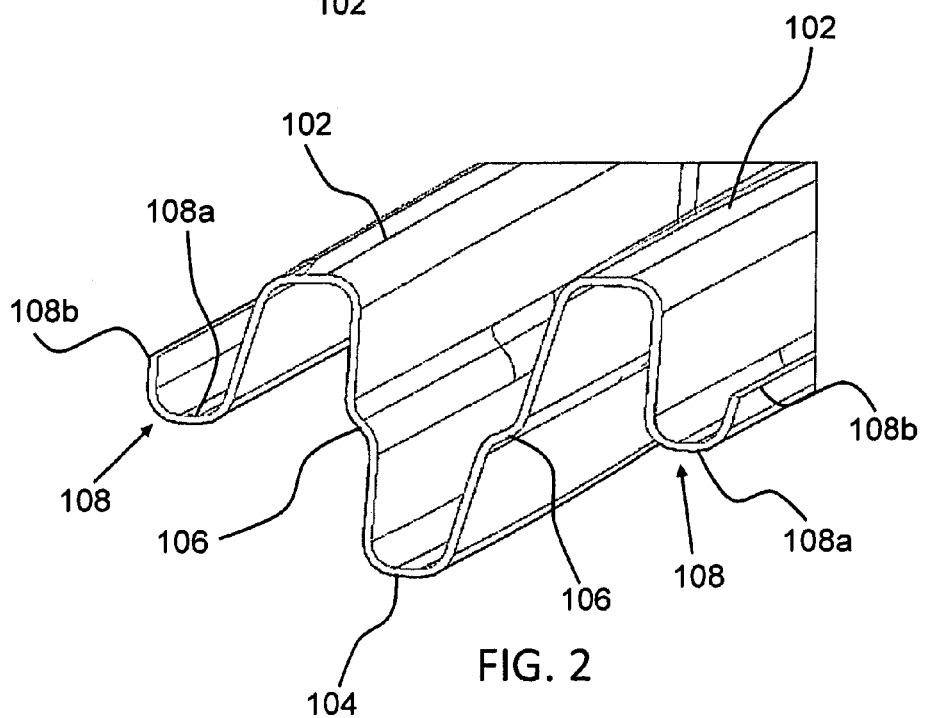
FIG. 2 is an enlarged cut-away view taken along the line A-A of FIG. 1.

Referring now to FIG. 2, shown is an enlarged cut-away view taken along the line A-A of FIG. 1. The edge flanges 108 are shown more clearly in FIG. 2, and include an outwardly extending intermediate portion 108a and a turned-up edge portion 108b. The intermediate portions 108a both lie approximately within a common plane, whilst the turned-up edge portions 108b are raised out of said common plane. Optionally, the turned-up edge portions 108b of the outer flanges 108 are omitted.

Figure 3:
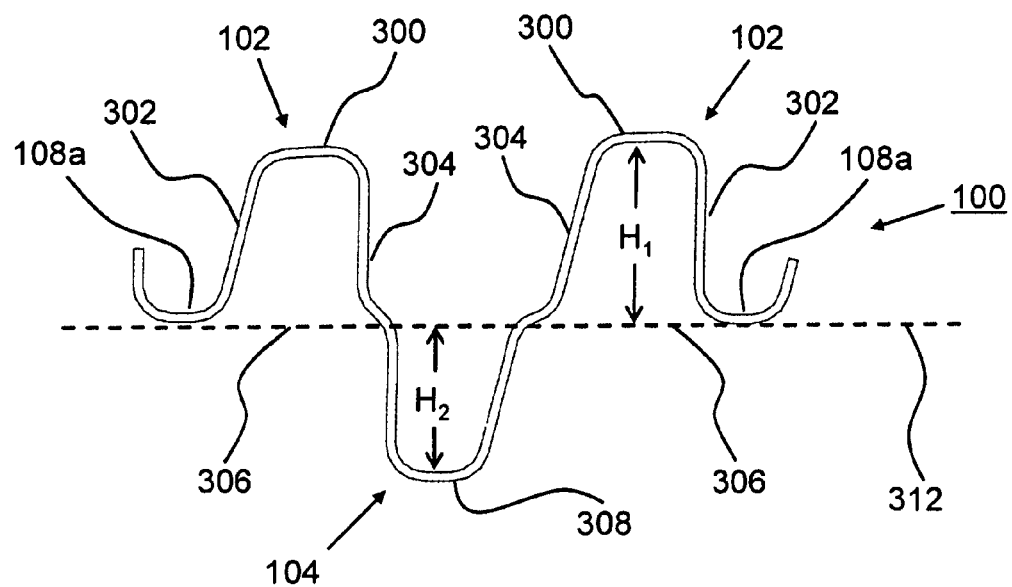
FIG. 3 is an enlarged sectional view taken along the line A-A of FIG. 1.

Referring now to FIG. 3, shown is an enlarged sectional view taken along the line A-A of FIG. 1. The two beads 102 of sheet metal strip 100 each include a top section 300, a first sidewall 302 and a second sidewall 304. The first sidewall 302 and second sidewall 304 are integral with the top section 300. The first sidewall 302 extends away from the top section 300 toward an open base section 306, and is integral with the intermediate portion 108a of outer flange 108. The second sidewall 304 extends away from top section 300 further than the first sidewall 302, so as to define simultaneously one of two opposite sidewalls of the valley-shaped third bead 104. Accordingly, the second sidewalls 304 are integral with a bottom section 308 of the valley-shaped third bead 104.

The open base section 306 of each of the two beads 102 lies approximately within the above-mentioned common plane, which is represented in the sectional view of FIG. 3 using a dashed line 312. Each of the two beads 102 has a height of approximately $H_1$, as measured from the open base section 306 to the top section 300. The third bead 104 has a height $H_2$ as measured from the open base section 306 of either of the two beads 102 to the bottom section 308. Since the two beads 102 and the third bead 104 protrude from opposite sides of the sheet metal strip 100, the peak-to-trough distance measured vertically between top section 300 and bottom section 308 is $H_1+H_2$.

Figure 4:
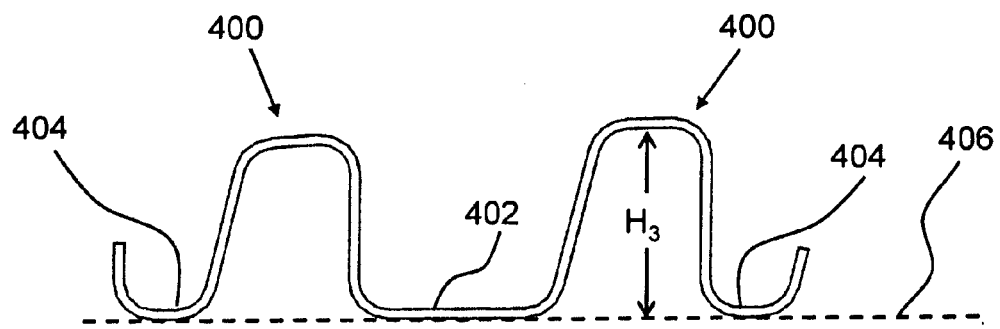
FIG. 4 is an enlarged sectional view taken through a middle portion of a prior art structural door beam for vehicles.

Referring now to FIG. 4, shown is an enlarged sectional view taken through a middle portion of a prior art structural door beam for vehicles. FIG. 4 depicts the common "two hat" configuration, having a central web defining two laterally spaced apart beads 400 that are separated by a generally planar medial region 402. Outer flanges 404 typically are integrally formed with the two laterally spaced apart beads 400, and extend along the side edges of the beam. In the sectional view, the medial region 402 and the outer flanges 404 lie approximately within a common plane, represented by the dashed line 406. The height of each of the two laterally spaced apart beads is approximately $H_3$.

Referring now to FIG. 3 and FIG. 4, typically, the height of beads that are formed in a cold forming process is limited for high strength steel to a maximum value of approximately 32 mm. It is known that cracks develop in the high strength steel material when this maximum value is exceeded. The formation of cracks in the finished product decreases the "material quality" of the product. Accordingly, the prior art structural door beam is limited to a maximum height of approximately $H_3=32$ mm before the "material quality" diminishes due to the formation of cracks. On the other hand, the structural door beam of FIG. 3 according to an embodiment of the instant invention achieves a maximum height of approximately $H_1+H_2=64$ mm whilst maintaining "material quality" by avoiding the formation of cracks. This increased height is the result of forming the third bead 104 in a first cold forming operation and forming the two mutually parallel beads 102 in a second cold forming operation. Optionally, $H_1$ and/or $H_2$ is less than the maximum value of 32 mm Of course, the above numerical examples are provided for illustrative purposes only so as to facilitate a better understanding of the instant invention. Different material compositions and/or thicknesses may be subject to different maximum bead-height limitations.

The structural door beam of FIG. 1 demonstrates improved performance in three point bending tests, compared to the prior art "two hat" beam. It is believed that the improved performance is due not only to the increased number of beads but also the increased peak-to-trough distance. Table 1 provides data that was obtained in a three point test based on the "two hat" beam as well as the beam of FIG. 1.

TABLE 1

Three Point Bending Test Data

| Version | Thickness [mm] | Material | Weight [g] | Max. Force [kN] | Max. Energy [J] |
|---|---|---|---|---|---|
| Two Beads Version | 1.5 | MSW1200 | 2772 | 15.00 | 2397 |
| Three Beads Version | 1.5 | MSW1200 | 2937 | 21.8 | 2995 |

Table 1 shows that the maximum force increased by approximately 45% for the three bead structural door beam compared to the prior art two bead version. In addition, the maximum energy measured for 200 mm deformation of the beam is approximately 25% greater for the three bead structural door beam compared to the prior art two bead version. The same high-strength steel material was used for each of the beams tested, with the three bead structural door beam weighing approximately 6% more than the two bead prior art version. The data presented in Table 1 illustrates that significant performance improvement is achieved with only a minimal weight increase of the part. Conversely, a three bead structural door beam having a thickness of 1.3 mm and a weight of approximately 2542 g provides the same performance (15.00 kN) as a two bead structural door beam weighing 2772 g. Accordingly, substantially the same performance is provided, but with an approximately 8% reduction in component weight.

Generally, it has been observed that increasing the height of third bead results in improved performance of the structural door beam relative to the prior art "two hat" beam, in terms of both the maximum force that is required to inelastically deform the beam and the maximum energy the beam absorbs. Accordingly, a predetermined performance increase may be achieved depending on the height of the third bead, within a range of allowable values.

Figure 5:
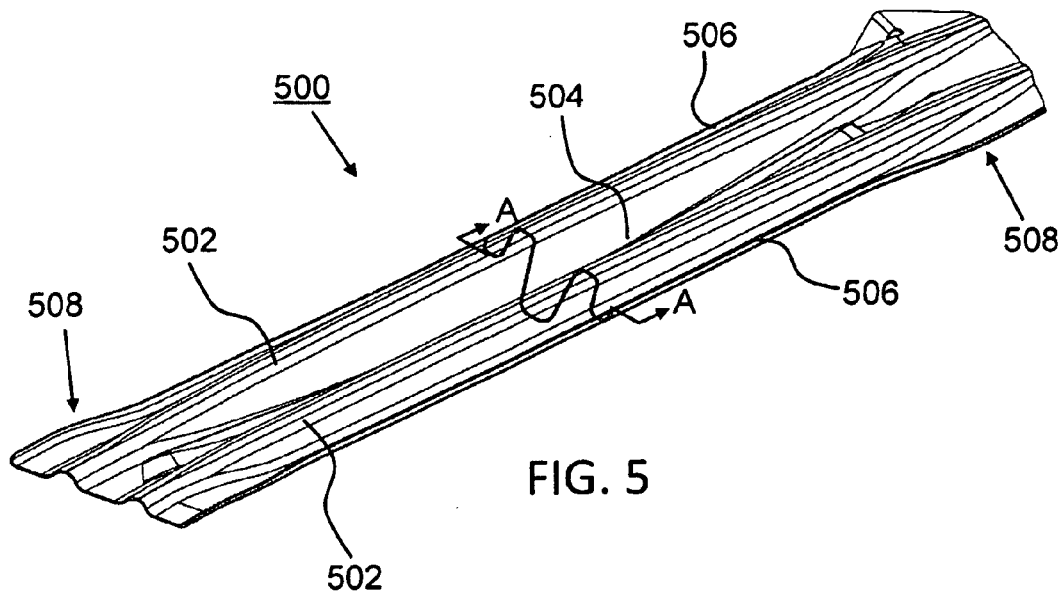
FIG. 5 is a perspective view of a structural door beam for vehicles according to another embodiment of the instant invention.

Referring to FIG. 5, shown is a perspective view of a structural door beam for vehicles according to another embodiment of the instant invention. The structural door beam includes an elongated sheet metal strip 500 of a high-strength steel material. By way of a specific and non-limiting example, the high-strength steel material has a tensile strength of at least 600 MPa. Two beads 502 are impressed in the sheet metal strip 500 by a forming method, such as for instance cold forming. In FIG. 5, the two beads 502 are mutually parallel and protrude from a same first side of the structural door beam. Optionally, the two beads 502 are not mutually parallel along at least a portion of the length of the metal strip 500. Disposed between the two beads 502 is a third bead 504, which is also impressed by a forming method, such as for instance cold forming. The third bead 504 extends parallel to each of the two beads 502, but it protrudes from a second opposite side of the structural door beam. In addition, outer flanges 506 extend longitudinally along the side edges of the sheet metal strip 500 between opposite ends thereof.

The two beads 502 extend over the larger part of the length of sheet metal strip 500, and have a maximum height relative to the first side of the sheet metal strip near the line A-A within a central portion of the structural door beam. The height of the two beads 502 decreases at the opposite ends of the sheet metal strip 500, toward integrally formed mounting flanges 508. The integrally formed mounting flanges 508 are for securing the structural door beam to a vehicle door. Similarly, the third bead 504 extends over the larger part of the length of sheet metal strip 500 and has a maximum height relative to the second side of the sheet metal strip near the line A-A within the central portion of the structural door beam. The height of the third bead 504 also decreases at the opposite ends of the sheet metal strip 500, toward the integrally formed mounting flanges 508.

Figure 6:
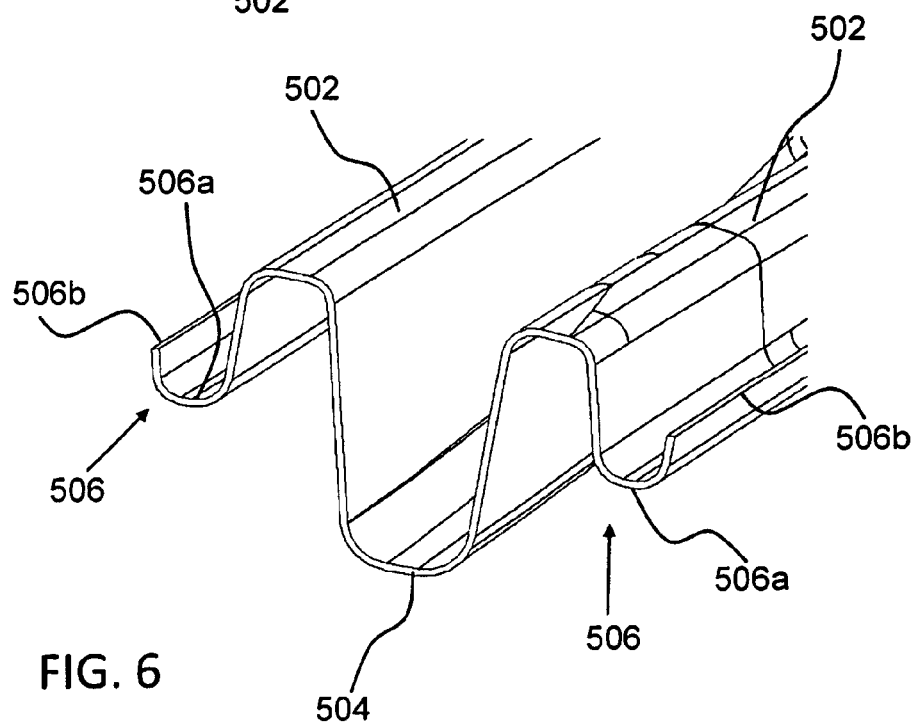
FIG. 6 is an enlarged cut-away view taken along the line A-A of FIG. 5.

Referring now to FIG. 6, shown is an enlarged cut-away view taken along the line A-A of FIG. 5. The edge flanges 506 are shown more clearly in FIG. 6, and include an outwardly extending intermediate portion 506a and a turned-up edge portion 506b. The intermediate portions 506a both lie approximately within a common plane, whilst the turned-up edge portions 506b are raised out of said common plane. Optionally, the turned-up edge portions 506b of the outer flanges 506 are omitted.

Figure 7:
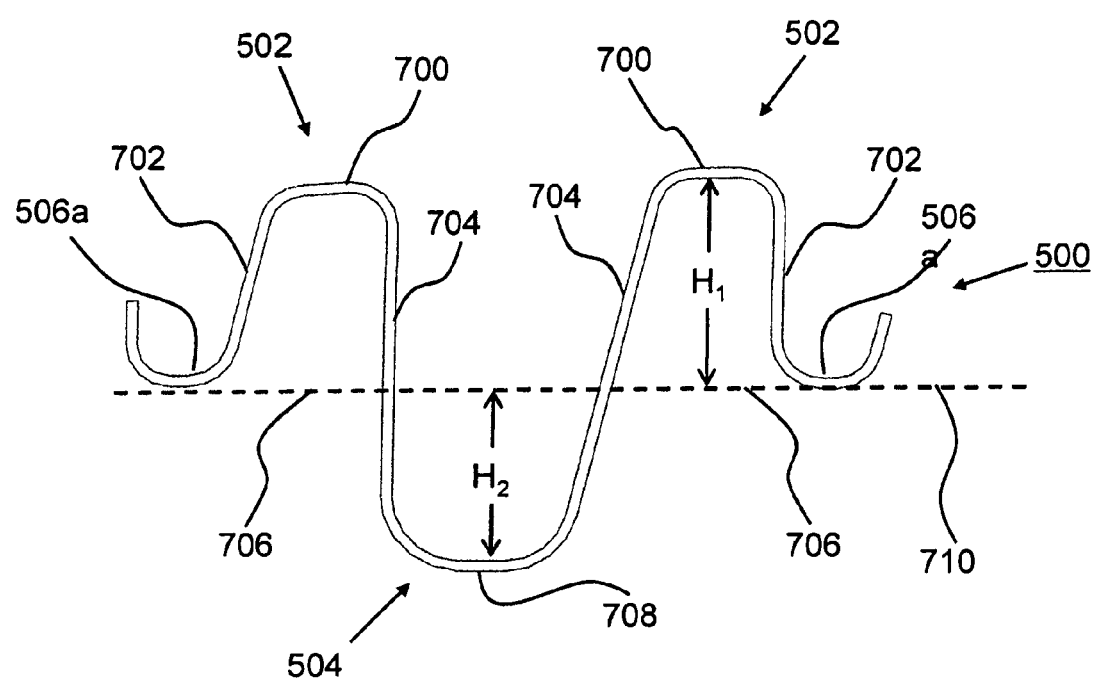
FIG. 7 is an enlarged sectional view taken along the line A-A of FIG. 5.

Referring now to FIG. 7, shown is an enlarged sectional view taken along the line A-A of FIG. 5. The two beads 502 of sheet metal strip 500 each include a top section 700, a first sidewall 702 and a second sidewall 704. The first sidewall 702 and second sidewall 704 are integral with the top section 700. The first sidewall 702 extends away from the top section 700 toward an open base section 706, and is integral with the intermediate portion 506a of outer flange 506. The second sidewall 704 extends away from top section 700 further than the first sidewall 702, so as to define simultaneously one of two opposite sidewalls of the valley-shaped third bead 504. Accordingly, the second sidewalls 704 are integral with a bottom section 708 of the valley-shaped third bead 504. However, unlike the sheet metal strip 100 that is illustrated in FIGS. 1 to 3, the sheet metal strip 500 shown in FIGS. 5 to 7 does not include a shoulder feature in the transition region between each of the two beads 502 and the third bead 504.

The open base section 706 of each of the two beads 502 lies approximately within the above-mentioned common plane, which is represented in the sectional view of FIG. 7 using a dashed line 710. Each of the two beads 502 has a height of approximately $H_1$, as measured from the open base section 706 to the top section 700. The third bead 504 has a height $H_2$ as measured from the open base section 706 of either of the two beads 502 to the bottom section 708. Since the two beads 502 and the third bead 504 protrude from opposite sides of the sheet metal strip 500, the peak-to-trough distance measured vertically between top section 700 and bottom section 708 is $H_1+H_2$.

Referring now to FIG. 7 and FIG. 4, typically, the height of beads that are formed in a cold forming process is limited for high strength steel to a maximum value of approximately 32 mm. It is known that cracks develop in the high strength steel material when this maximum value is exceeded. The formation of cracks in the finished product decreases the "material quality" of the product. Accordingly, the prior art structural door beam is limited to a maximum height of approximately $H_3=32$ mm before the "material quality" diminishes due to the formation of cracks. On the other hand, the structural door beam of FIG. 7 according to an embodiment of the instant invention achieves a maximum height of approximately $H_1+H_2=64$ mm whilst maintaining "material quality" by avoiding the formation of cracks. This increased height is the result of forming the third bead 504 in a first cold forming operation and forming the two mutually parallel beads 502 in a second cold forming operation. Optionally, $H_1$ and/or $H_2$ is less than the maximum value of 32 mm Of course, the above numerical examples are provided for illustrative purposes only so as to facilitate a better understanding of the instant invention. Different material compositions and/or thicknesses may be subject to different maximum bead-height limitations.

Figure 8:
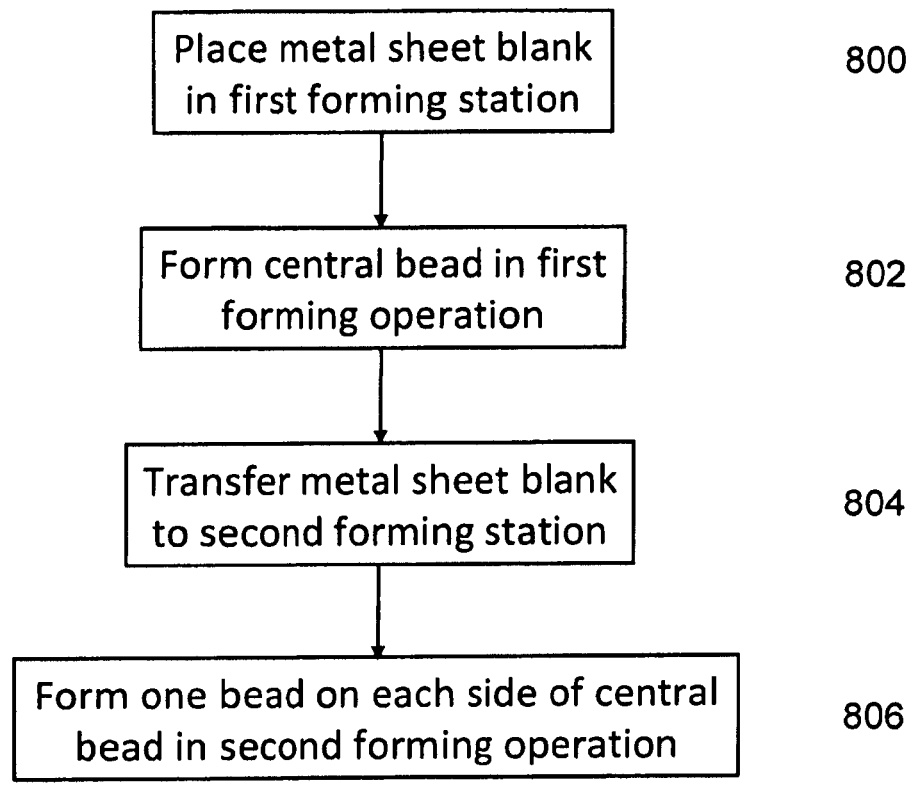
FIG. 8 is a simplified flow diagram of a method according to an embodiment of the instant invention.

Referring now to FIG. 8, shown is a simplified flow diagram of a method according to an embodiment of the instant invention. At 800 a flat blank, such as for instance a sheet of high strength steel having a tensile strength of at least 600 MPa, is placed in a first forming station. In a first forming operation 802, such as for instance a cold forming operation, a center bead is drawn in one direction to a predetermined depth, whilst portions of the flat blank that are adjacent to the center bead remain substantially unformed. The partially formed blank is trimmed in a cutting operation to establish the contour of the outer trim on the finished product. At 804 the trimmed, partially formed blank is transferred to a second forming station. In a second forming operation 806, such as for instance a cold forming operation, the center bead his held on a formpunch so that the already formed bead does not lose its shape. Two additional beads are formed in the second forming operation 806, one bead within a substantially unformed region on each side of the center bead, the two additional beads being formed in a direction opposite to that of the center bead. The structural door beam that is formed according to the method of FIG. 8 includes an outer flange extending longitudinally along each trimmed side edge of the product. Optionally, the outer flanges are turned-up so as to form a substantially semi-circular, trough-shaped flange along the side edges of the product. In this case, the radius of the trough-shaped flange is made sufficiently large avoid forming cracks, which may result when the high-strength steel material is bent to a sharp angle.

The configurations that are described with reference to FIGS. 1-3 and 5-7 are provided as specific and non-limiting examples for the purpose of illustrating suitable profiles that may be used for forming structural door beams according to embodiments of the instant invention. In general, with reference to FIGS. 3 and 7, the value of $H_2$ is greater than approximately $0.2H_1$. For instance, $H_2$ is within the range of approximately $0.2H_1$ to approximately $H_1$. At the current time, it is believed that substantial performance improvements are obtained particularly when $H_2$ is within the range of approximately $0.5H_1$ to approximately $0.9H_1$. The top section of beads 102 and 502, or the bottom section of beads 104 and 504, are shown slightly flattened in the preceding figures. Optionally, the bead tops and bottoms are formed with a more semi-circular profile. In particular, sharp angles are avoided, and a radius of curvature is selected that is sufficiently large to avoid forming cracks in the sheet metal strips 100 or 500. Further optionally, the height of the two beads 102 or 502 is different. In this case, the bead with the greatest height defines the value of $H_1$. Optionally, the two beads 102 or the two beads 502 are approximately mutually parallel, within the tolerances of the forming process that is employed. Alternatively, the two beads 102 or the two beads 502 deviate from being mutually parallel over at least a portion of the length thereof. Further optionally, the intermediate portions of the outer flanges 108 or 506 do not lie within a common plane. In this case, the open base sections of the beads 102 or of the beads 502 also do not lie in a common plane. The maximum peak-to-trough distance, as measured vertically to the top of the bead 102 or 502 that is "shifted upward," is limited to no more than approximately two times the maximum height that is achievable using a single cold forming operation. Further, the structural door beam optionally is curved in the longitudinal direction, or is otherwise adapted in geometry without affecting substantially the above-described cross-sectional profile, so as to be mountable in the doors of different vehicles.

The various embodiments of the instant invention are described in the context of a cold forming method, in which various features are impressed in a sheet metal blank in more than one forming operation. Of course, the structural door beams that are described with reference to FIGS. 1 to 3 or with reference to FIGS. 5 to 7 may be fabricated using a process other than cold forming, as will be readily apparent to a person having ordinary skill in the art.

Numerous other embodiments may be envisaged without departing from the scope of the instant invention.

What is claimed is:

1. A method of forming an elongate multiple channel structural door beam for vehicles, comprising:

forming a center channel of an elongate multiple channel structural door beam from a central web of given thickness and known material composition by a first cold forming operation;

forming two outer channels of the elongate multiple channel structure door beam by a second cold forming operation subsequent to the first cold forming operation, wherein the two outer channels are separated one from the other in a lateral direction and disposed on opposite sides of the center channel and a first one of the two outer channels is drawn to a peak of known height H; and wherein the center channel defines a trough between the two outer channels, wherein the material quality and trough to peak distance exceeds a maximum quality and distance that is achievable in a single cold forming operation for the given thickness and material composition of the web.

2. A method according to claim 1, wherein the other one of the two outer channels is drawn to a peak of a known height that is the same as the height of the peak of the first one of the two outer channels.

3. A method according to claim 1, wherein the other one of the two outer channels is drawn to a peak of a known height that is less than the height of the peak of the first one of the two outer channels.

4. A method according to claim 1, wherein the central web comprises high strength steel.

5. A method according to claim 4, wherein the high strength steel has a tensile strength of at least 600 MPa.

6. A method according to claim 1, wherein the two outer channels and the center channel are mutually parallel.

7. The method according to claim 1, wherein the trough is drawn to a depth of between approximately 0.2H and approximately H.

8. The method according to claim 1, wherein the trough is drawn to a depth of greater than approximately 0.5H.

9. The method according to claim 8, wherein the depth of the trough is less than approximately 0.9H.

* * * * *